United States Patent
Kim et al.

(10) Patent No.: US 12,335,270 B2
(45) Date of Patent: Jun. 17, 2025

(54) METHOD OF PROVIDING GAME BASED ON SECURITY LEVEL OF TERMINAL, AND APPARATUS FOR PERFORMING THE SAME

(71) Applicant: NEXON KOREA CORPORATION, Seongnam-si (KR)

(72) Inventors: Kion Kim, Seongnam-si (KR); Min Seok Jang, Seongnam-si (KR)

(73) Assignee: NEXON KOREA CORPORATION, Seongnam-si (KR)

(*) Notice: Subject to any disclaimer, the term of this patent is extended or adjusted under 35 U.S.C. 154(b) by 594 days.

(21) Appl. No.: 17/326,693

(22) Filed: May 21, 2021

(65) Prior Publication Data

US 2021/0409420 A1    Dec. 30, 2021

(30) Foreign Application Priority Data

Jun. 25, 2020    (KR) ........................ 10-2020-0077849

(51) Int. Cl.
| | |
|---|---|
| H04L 9/40 | (2022.01) |
| A63F 13/35 | (2014.01) |
| A63F 13/533 | (2014.01) |
| A63F 13/69 | (2014.01) |
| A63F 13/71 | (2014.01) |
| A63F 13/73 | (2014.01) |

(Continued)

(52) U.S. Cl.
CPC .......... H04L 63/105 (2013.01); A63F 13/533 (2014.09); A63F 13/69 (2014.09);
(Continued)

(58) Field of Classification Search
CPC ... H04L 63/105; H04L 67/131; H04L 63/104; H04L 63/20; A63F 13/533; A63F 13/69;
(Continued)

(56) References Cited

U.S. PATENT DOCUMENTS

| | | | |
|---|---|---|---|
| 8,475,270 B2* | 7/2013 | Fujimoto | A63F 13/12 463/43 |
| 2003/0229779 A1* | 12/2003 | Morais | H04L 63/0209 713/153 |

(Continued)

FOREIGN PATENT DOCUMENTS

| | | |
|---|---|---|
| JP | 5476648 B1 | 4/2014 |
| JP | 2014-106920 A | 6/2014 |
| KR | 10-2017-0006034 A | 1/2017 |

OTHER PUBLICATIONS

Edge, "How to remove the secondary password and trading restriction when logging in to MapleStory, and still improve security!", Jun. 15, 2019, URL: https://blog.naver.com/minseo5547/221562082843 (12 pages total).

(Continued)

*Primary Examiner* — Michael Simitoski
*Assistant Examiner* — Andrew Suh
(74) *Attorney, Agent, or Firm* — Sughrue Mion, PLLC

(57) ABSTRACT

Disclosed herein are a method of providing a game based on the security level of a terminal and an apparatus for performing the same. The method of providing a game based on the security level of a terminal includes: when a user accesses a game using a terminal, checking the security level of the terminal for the account of the user; and determining whether to allow the disposal of in-game goods according to the found security level, but providing the game so that the game can be played regardless of the found security level.

18 Claims, 10 Drawing Sheets

(51) Int. Cl.
　　　A63F 13/75　　(2014.01)
　　　A63F 13/79　　(2014.01)
　　　G06F 21/44　　(2013.01)
　　　H04L 67/131　(2022.01)

(52) U.S. Cl.
　　　CPC .............. *A63F 13/73* (2014.09); *A63F 13/79*
　　　　　　(2014.09); *A63F 2300/308* (2013.01); *A63F*
　　　　　　　　*2300/532* (2013.01); *A63F 2300/5546*
　　　　　　　　　(2013.01); *A63F 2300/609* (2013.01)

(58) Field of Classification Search
　　　CPC .... A63F 13/73; A63F 13/79; A63F 2300/308;
　　　　　　A63F 2300/532; A63F 2300/5546; A63F
　　　　　　2300/609; A63F 13/35; A63F 13/71;
　　　　　　A63F 13/75; A63F 2300/401; A63F
　　　　　　2300/575; G06F 21/44; G06F 2221/2109
　　　See application file for complete search history.

(56) References Cited

U.S. PATENT DOCUMENTS

| | | | | |
|---|---|---|---|---|
| 2008/0234047 | A1* | 9/2008 | Nguyen | G07F 17/3234 463/42 |
| 2015/0024852 | A1* | 1/2015 | Pacey | A63F 13/58 463/43 |
| 2016/0292412 | A1* | 10/2016 | Stoner | H04L 63/0876 |
| 2018/0107944 | A1* | 4/2018 | Lin | G06Q 20/4016 |
| 2018/0205740 | A1* | 7/2018 | Clark | G06Q 10/107 |
| 2020/0226799 | A1* | 7/2020 | Pease | G06T 11/001 |
| 2021/0038979 | A1* | 2/2021 | Bleasdale-Shepherd | A63F 13/85 |
| 2021/0350012 | A1* | 11/2021 | Delaney | H04L 63/20 |

OTHER PUBLICATIONS

Twobucks Co., Ltd., "Study on Technical Countermeasures against Security Breaches in Online Games", May 1, 2010, pp. 1, 31(29), URL: https://www.kocca.kr/cop/bbs/view/B0000147/1215520.do?searchCnd=&searchWrd=&cafeTp1=&cafeTp2=&useAI=&menuNo=200904&categorys=0&subcate=0&cateCode=&type=&instNo=0&questionTp=&uf_S (116 pages total).

Kbench, "Useful Tips to Avoid Accidentally Selling/Disassembling Items in Lost Ark", Nov. 16, 2018, URL: https://kbench.com/?q=node/193292 (4 pages total).

Masangsoft, "[Guideline] How to Block Logins from Other Countries", Sep. 15, 2017, URL: https://pt.masangsoft.com/PT_BOARD1/4144929 (6 pages total).

* cited by examiner

METHOD OF PROVIDING GAME BASED ON SECURITY LEVEL OF TERMINAL, AND APPARATUS FOR PERFORMING THE SAME

CROSS-REFERENCE TO RELATED APPLICATION

This application claims the benefit of Korean Patent Application No. 10-2020-0077849 filed on Jun. 25, 2020, which is hereby incorporated by reference herein in its entirety.

BACKGROUND

1. Technical Field

The embodiments disclosed herein relate to an apparatus and method for providing a game, and more particularly to an apparatus and method for providing a game based on the security level of a terminal that is used for access to the game.

2. Description of the Related Art

In-game goods such as game items and game money are elements that allow a game to be enjoyed in a more relaxed and diverse fashion. In order to obtain such in-game goods, users generally have to invest time and money-related efforts.

Accordingly, there are endless attempts to steal in-game goods by means of fraudulent methods. For example, a hacker attempts to access a game using account information obtained by hacking another site or accesses a game using the account of another person obtained by thieving account information for the game using malicious code, and then transfers in-game goods to the account of the hacker.

Therefore, the importance of a security maintenance method for preventing such fraudulent behavior is increasing more and more.

As a related art, Korean Patent Application Publication No. 10-2017-0048779 discloses a method of maintaining security by checking a security level associated with an application or service requested to be executed and then changing and displaying at least a part of a graphic object based on the found security level. However, even according to this related art, a problem still remains in that when user account information is hacked, it is not possible to prevent the theft of in-game goods online.

Meanwhile, the above-described background technology corresponds to technical information that has been possessed by the present inventor in order to contrive the present invention or that has been acquired in the process of contriving the present invention, and can not necessarily be regarded as well-known technology that had been known to the public prior to the filing of the present invention.

SUMMARY

The embodiments disclosed herein are intended to provide an effective security system that may provide a victim with the time required to recognize and defend against hacking even when an account is hacked.

The embodiments disclosed herein are intended to provide a security system that may minimize inconvenience in the play of a game while effectively preventing the theft of in-game goods for a predetermined period of time.

As a technical solution for accomplishing at least one of the above objects, according to one embodiment, there is provided a method of providing a game based on the security level of a terminal, the method including: when a user accesses a game using a terminal, checking the security level of the terminal for the account of the user; and determining whether to allow the disposal of in-game goods according to the found security level, but providing the game so that the game can be played regardless of the found security level.

According to another embodiment, there is provided a non-transitory computer-readable storage medium having stored thereon a computer program that, when executed by a processor, causes the processor to perform a method of providing a game, wherein the method includes: when a user accesses a game using a terminal, checking the security level of the terminal for the account of the user; and determining whether to allow the disposal of in-game goods according to the found security level, but providing the game so that the game can be played regardless of the found security level.

According to still another embodiment, there is provided a computer program that is executed by a game provision apparatus and stored in a storage medium to perform a method of providing a game, wherein the method includes: when a user accesses a game using a terminal, checking the security level of the terminal for the account of the user; and determining whether to allow the disposal of in-game goods according to the found security level, but providing the game so that the game can be played regardless of the found security level.

According to still another embodiment, there is provided an apparatus for providing a game, the apparatus including: a communication interface configured to perform communication with a terminal; storage configured to store data and a program necessary for the provision of a game; and a controller configured to provide the game based on the security level of the terminal by executing the program; wherein when a user accesses the game using the terminal, the controller checks the security level of the terminal for the account of the user, and determines whether to allow the disposal of in-game goods according to the found security level, but provides the game so that the game can be played regardless of the found security level.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

Figure 1:
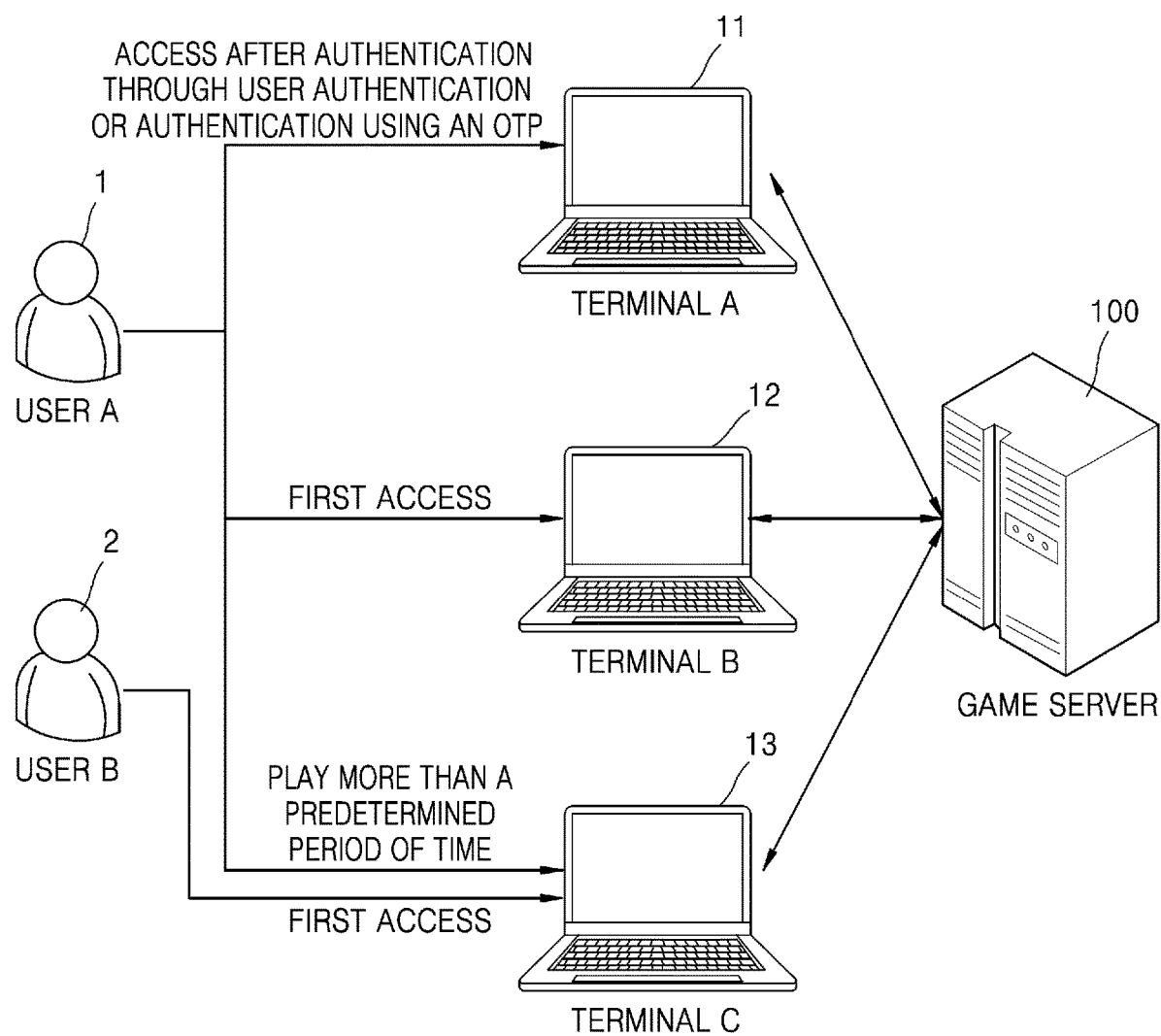
FIG. 1 is a diagram illustrating an example in which a security level varies depending on a user account and a terminal in a game provision system according to an embodiment.

Various embodiments will be described in detail below with reference to the accompanying drawings. The following embodiments may be modified to various different forms and then practiced. In order to more clearly illustrate features of the embodiments, detailed descriptions of items that are well known to those having ordinary skill in the art to which the following embodiments pertain will be omitted. Furthermore, in the drawings, portions unrelated to descriptions of the embodiments will be omitted. Throughout the specification, like reference symbols will be assigned to like portions.

Throughout the specification, when one component is described as being "connected or coupled" to another component, this includes not only a case where the one component is "directly connected or coupled" to the other component but also a case where the one component is "connected or coupled to the other component with a third component disposed therebetween." Furthermore, when one portion is described as "including or comprising" one component, this does not mean that the portion does not exclude another component but means that the portion may further include another component, unless explicitly described to the contrary.

The embodiments will be described in detail below with reference to the accompanying drawings.

Prior to the following description, the meanings of the terms used below will be defined first.

The term "in-game goods" is a generic term for objects that can be used in a game and have property values, such as game items or game money. A user can acquire in-game goods by playing a game or paying for them.

The term "disposal of in-game goods" is based on a concept including both a transaction and an exchange, and specifically includes all actions resulting in loss of ownership of goods, such as purchasing items, selling items, discarding items, and using game money.

The term "security level" refers to the degree to which a terminal is reliable and which is represented by a level. The security level of a terminal is determined based on cumulative reliability. The security level of a terminal may be determined for each user account. In other words, even for the same terminal, a security level may vary depending on the user account that is used when a game is accessed. In the embodiments to be described below, for ease of description, security levels are divided into three levels. In other words, a terminal having the lowest security level is called a "red PC," a terminal having an intermediate security level is called a "yellow PC," and a terminal having the highest security level is called a "green PC."

When a terminal is used for the first time to access a game or when the reliability accumulated by playing a game through a terminal is lower than a predetermined reference value, the terminal is classified as a red PC.

When the reliability accumulated by playing a game through a terminal is equal to or higher than the predetermined reference value, the terminal is classified as a yellow PC. In other words, when a user has played a game for a considerable amount of time using a specific terminal, the terminal is regarded as a reliable terminal for that user.

When authentication according to a pre-designated method is successful upon accessing a game through a terminal, the corresponding terminal is classified as a green PC. For example, when a user succeeds in user authenticating using a smartphone or in authentication using a one-time password (OTP), a corresponding terminal is classified as a green PC. As long as the authentication according to the pre-designated method is successful, a terminal may be classified as a green PC even when a game is accessed for the first time through the terminal or cumulative reliability is lower than a reference value.

It is obvious that the security levels may be divided into various different security levels and criteria for the security levels may be set in various different manners.

Terms requiring descriptions, other than the terms defined above, will be separately described below.

FIG. 1 is a diagram illustrating an example in which a security level varies depending on a user account and a terminal in a game provision system according to an embodiment. When the above-described security level classification criteria are applied, how the security level of each terminal is determined for two different users will be described below.

Referring to FIG. 1, a game provision system according to an embodiment may include terminals 11, 12, and 13, and a game server 100.

A case where user A 1 accesses a game through the three terminals 11, 12, and 13 will be described. If user A 1 performs user authentication or authentication using an OTP when accessing the game through terminal A 11, terminal A 11 is classified as a green PC for the account of user A 1. Furthermore, if user A 1 first accesses the game through terminal B 12, terminal B 12 is classified as a red PC for the account of user A 1. In addition, if user A 1 plays the game through terminal C 13 for a predetermined period of time or longer and accumulated reliability is equal to or higher than a reference value, terminal C 13 is classified as a yellow PC for the account of user A 1.

Meanwhile, if user B 2 first accesses the game through terminal C 13, terminal C 13 is classified as a red PC for the account of user B 2. In other words, although terminal C 13 is a single terminal, it is classified as a yellow PC for the account of user A 1, and is classified as a red PC for the account of user B 2. In a space used by a large number of people such as an Internet cafe, different users may play the same game through the same terminal. As described above, the security level of a terminal is assigned for each account, and thus the effect of substantially protecting a user account may be expected.

A detailed method in which the game server 100 provides a game based on the security level of the terminal 11, 12, or 13 will be described below.

Figure 2:
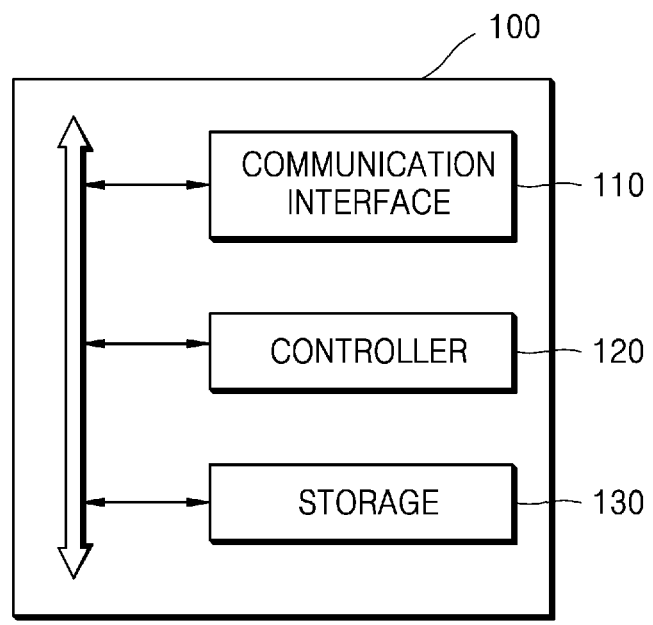
FIG. 2 is a diagram showing the configuration of a game provision apparatus according to an embodiment.

FIG. 2 is a diagram showing the configuration of a game provision apparatus according to an embodiment. The game provision apparatus shown in FIG. 2 corresponds to the game server 100 of FIG. 1. Referring to FIG. 2, the game server 100 may include a communication interface 110, a controller 120, and storage 130.

The communication interface 110 is a component configured to perform wired/wireless communication with another device or a network. The game server 100 may transmit and receive data necessary for the provision of the game to and from the terminals 11, 12, and 13 through the communication interface 110. To this end, the communication interface 110 may include a communication module configured to support at least one of various wired/wireless communication methods. For example, the communication module may be implemented in the form of a chipset.

The wireless communication supported by the communication interface 110 may be, e.g., Wireless Fidelity (Wi-Fi), Wi-Fi Direct, Bluetooth, Ultra-WideBand (UWB), or Near Field Communication (NFC). In addition, the wired communication supported by the communication unit 110 may be, e.g., Universal Serial Bus (USB) or High Definition Multimedia Interface (HDMI).

The controller 120 is a component including at least one processor such as a central processing unit (CPU), and is a component configured to control the overall operation of the game server 100. The controller 120 may transmit user interface (UI) screens necessary for the play of the game to the terminal 11, 12, or 13 by executing a program stored in the storage 130, which will be described later. In addition, the controller 120 may check the security level of the terminal 11, 12, or 13, and may determine whether to allow the disposal of in-game goods.

A process in which the controller 120 checks the security level of the terminal will be described in detail below. When access to the game through the terminal is detected, the controller 120 checks the identification code assigned to the terminal, checks the security level of the terminal if the security level of the terminal has already been determined for a user account used for the access to the game, and determines the security level of the terminal to be the lowest security level if the terminal is a terminal that is first used for the user account used for the access to the game. To this end, a unique identification code may be assigned to each terminal. The identification code may be generated using the hardware information (e.g. a model name, or a serial number) and location information of the terminal. In this case, although the location information may be information specifically indicating the geographic location of the terminal, it may be information (e.g., the business registration number of an Internet cafe) indicating only whether a corresponding location is a shared space such as an Internet cafe.

To check the security level, the controller 120 may store the identification code of the terminal, accumulated reliability and a security level for each user account in the storage 130, and may access and use it whenever access is made to a game.

As described above, the security level of the terminal may be determined according to the accumulated reliability. To this end, the controller 120 needs to calculate and record the accumulated reliability for each terminal. A detailed description of a method in which the controller 120 manages the reliability of a terminal and determines a security level according to the reliability is as follows.

The controller 120 basically accumulates the reliability of the terminal in proportion to the time for which a user plays the game through the terminal. However, when the reliability is accumulated based only on the play time, a problem may occur in that the inconvenience that a user has to bear is excessively large compared to the effect of protecting an account, and the scheme may be abused or be disadvantageous to a new user. Accordingly, the controller 120 may adjust the rate at which the reliability is accumulated or a limit on the reliability that can be accumulated for each period (e.g., a day) by taking into consideration various circumstances.

According to an embodiment, the controller 120 may set the rate at which the reliability is accumulated differently according to the type of play of the user. For example, when the user does not perform any active play after accessing the game and simply maintains a connected state, the controller 120 allows the reliability to be accumulated at a lower rate. In contrast, when the user performs active play such as hunting or fighting, the controller 120 allows the reliability to be accumulated at a higher rate.

Furthermore, according to an embodiment, the controller 120 may set the limit on the reliability that can be accumulated a day differently according to the type of play of the user. For example, the controller 120 may set a wider limit on the reliability that can be accumulated a day when the user performs an active play (e.g., hunting or fighting) than when the user performs a non-active play (e.g., the user simply maintains a connection).

According to an embodiment, the controller 120 may set the rate at which the reliability is accumulated differently depending on whether the user is a new user (e.g., a user for whom a predetermined period has not elapsed after the generation of a user account). The reason for this is that a new user generally does not have a large quantity of in-game goods, so that it is appropriate to increase the security level of the terminal more rapidly than that of an old user when both security and user convenience are taken into consideration. Accordingly, the controller 120 may allow the reliability to be accumulated at a higher rate when the user is a new user than when the user is not a new user.

Furthermore, according to an embodiment, the controller 120 may set a limit on the reliability that can be accumulated a day differently depending on whether the user is a new user. For example, the controller 120 may set a wider limit on the reliability that can be accumulated a day when the user is a new user than when the user is not a new user.

According to an embodiment, the controller 120 may set the rate at which the reliability is accumulated differently according to the location of the terminal. When a terminal is located in a shared space used by a large number of users, such as an Internet cafe, the possibility that the terminal is exposed to a security risk is relatively high compared to that in a private space, so that it is necessary to lower the rate at which the security level is increased. Accordingly, the controller 120 may allow the reliability to be accumulated at a lower rate when the terminal is located in a shared space such as an Internet cafe than when the terminal is located in a private space.

Furthermore, according to an embodiment, the controller 120 may set a limit on the reliability that can be accumulated a day differently according to the location of the terminal. For example, the controller 120 may set a narrower limit on the reliability that can be accumulated a day when the terminal is located in a shared space such as an Internet cafe than when the terminal is located in a private space.

The controller 120 accumulates the reliability of the terminal according to the method described above, and increases the security level of the terminal when the accumulated reliability is equal to or higher than a predetermined reference value. However, in order for the terminal to be upgraded to a specific security level, not only the accumulation of reliability but also additional authentication may be necessary. For example, in the example of the security level assumed above, the user can upgrade the security level of the terminal from the red PC to the yellow PC by playing the game for a predetermined period of time or longer. However, thereafter, no matter how many hours the user plays the game, the security level of the terminal is not upgraded to the green PC unless authentication is performed according to a pre-designated method.

The controller 120 may determine whether to allow the disposal of the in-game goods according to the identified security level of the terminal. In other words, when a user who plays the game through a specific terminal requests the disposal of in-game goods, the controller 120 may determine whether to allow the disposal based on the security level of the corresponding terminal. When a request is made for the disposal of in-game goods through a terminal having a low security level, the controller 120 may protect the account of the user by prohibiting the disposal.

When the security level of the terminal is the highest, the controller 120 may allow not only the disposal of goods but also the locking and unlocking of the disposal. For example, the controller 120 may allow the disposal of goods to both the yellow PC and the green PC, but may allow the locking and unlocking of the disposal of goods only to the green PC. When locking is set for the disposal of specific goods, the disposal of the goods is prohibited regardless of the security level of the terminal until the locking is released. Accordingly, the in-game goods may be more safely protected by using locking and unlocking functions for the disposal of goods.

Meanwhile, the controller 120 enables the play of the game through the terminal regardless of the security level of the terminal. If the game cannot be played when the security level of the terminal is low, the effect of protecting an account may be higher, but the inconvenience caused to a user in return for the above effect may be excessively serious, with the result that the play itself is not prohibited. Even when a hacker accesses the game using hacked account information, the act of playing the game itself is allowed because the degree of damage to the user resulting from the act of playing the game is less than that resulting from the disposal of goods.

The controller 120 may transmit a UI screen including information associated with the security level of the terminal to the terminal so that the UI screen can be displayed on the display of the terminal. The UI screen associated with the security level of the terminal will be described in detail below with reference to FIGS. 6 to 10.

FIGS. 6 to 10 are diagrams showing UI screens that are displayed on a terminal in the process of providing a game based on the security level of the terminal according to an embodiment. In other words, the UI screens shown in FIGS. 6 to 10 are based on data generated by the controller 120 of the game server 100 and transmitted to the terminals 11, 12, and 13 via the communication unit 110.

Figure 6:
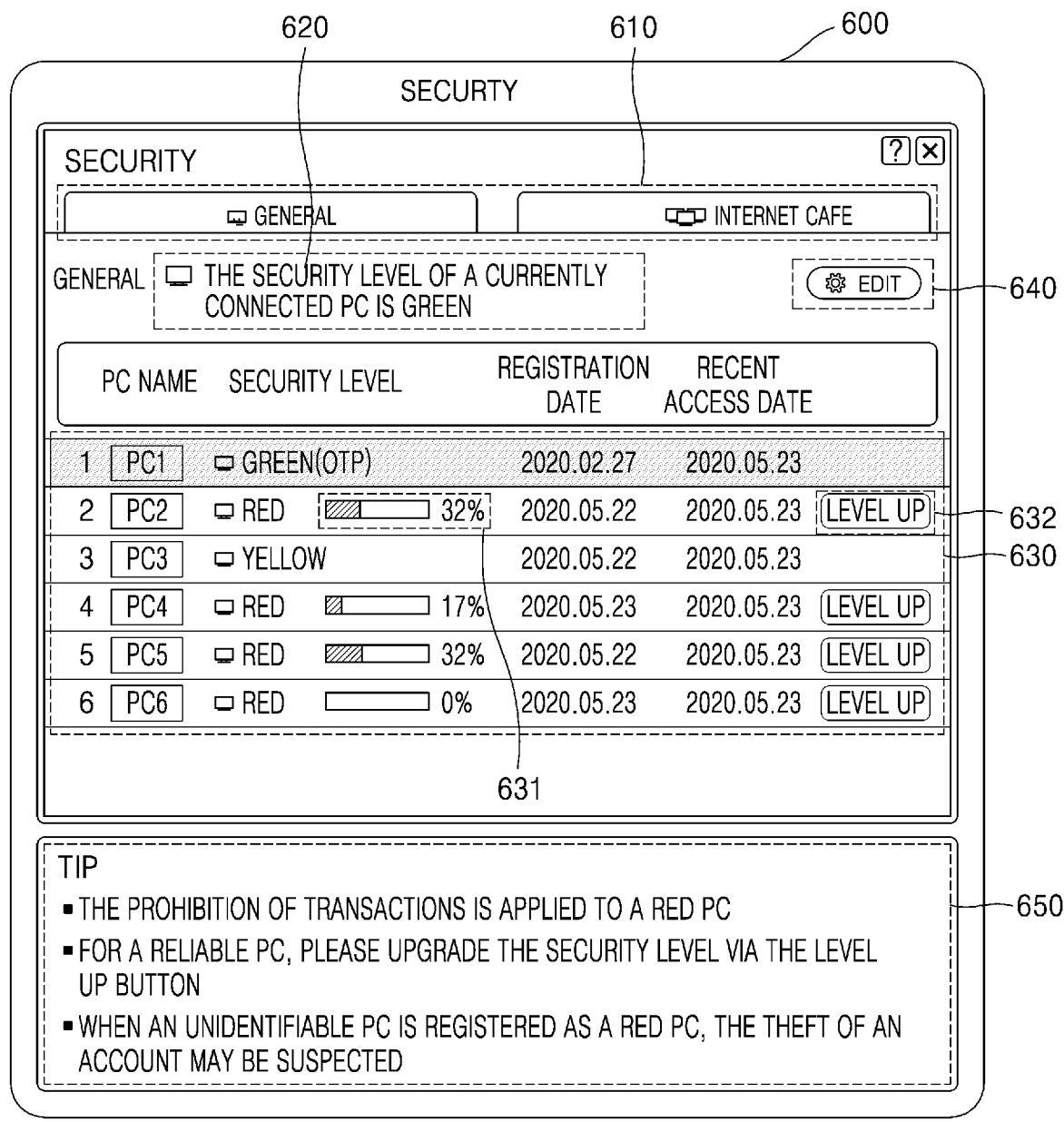
FIGS. 6 to 10 are diagrams showing user interface (UI) screens that are displayed on a terminal in the process of providing a game based on the security level of the terminal according to an embodiment.

Referring to FIG. 6, information related to the security level of the terminal is displayed on a first screen 600. Tabs each configured to select whether to display a list of terminals used in a designated area are displayed in region 610. When a user selects "general," a list of terminals that have a history of playing a game using the account of the user and are also located in areas other than an Internet cafe is displayed. In contrast, when the user selects "Internet cafe," a list of terminals that have a history of playing the game using the account of the user and are also located in an Internet cafe is displayed. In FIG. 6, the tab "general" is selected in the region 610, and thus a list of terminals that are located in the areas other than the Internet cafe is displayed in region 630.

A statement that provides notification of the security level of a currently connected terminal is displayed in region 620.

Information such as the security level, cumulative reliability status, registration date, and recent access date of each terminal may be displayed in the list of terminals displayed in the region 630. In area 631, the cumulative reliability for the terminal "PC2" is marked as 32%. This means that 32% of the reliability required to be upgraded to the yellow PC has been currently accumulated.

Furthermore, in region 632, a button configured to upgrade the security level of another terminal from the red PC to the yellow PC may be displayed. When access is made through the green PC, this means that security is maintained at a considerably high level, and thus other terminals having the security level of the red PC are allowed to be upgraded to the yellow PC.

The user may edit the list displayed in the region 630 by selecting the button in region 640. For example, the user may initialize cumulative reliability for a specific terminal, or may delete a specific terminal from a list.

In region 650, various types of guidance according to the security levels of terminals may be displayed.

In this way, the user may check the security levels and cumulative reliability statuses of all terminals used for the play of the game using his or her account through the UI screen, thereby becoming aware that a terminal that the user does not know has accessed the game through the hacking of the account information and that the reliability is being accumulated through the terminal without knowing it and then taking measures accordingly. For example, when the reliability is being accumulated through the terminal that the user does not know, the user may protect his in-game goods by suspecting the hacking of the account information and taking measures to change the account information or to initialize the cumulative reliability for the corresponding terminal.

Figure 7:
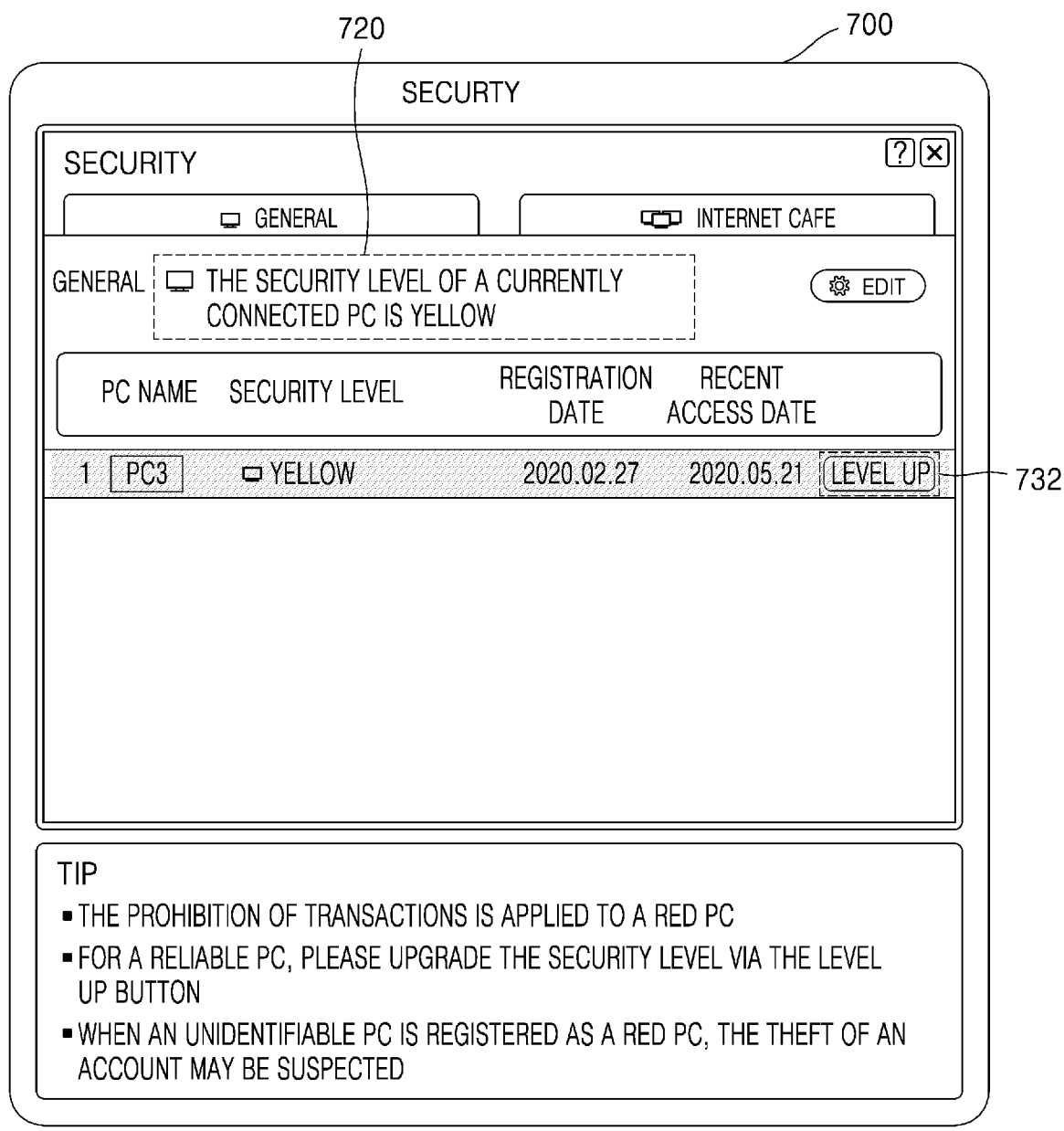

Referring to FIG. 7, the security level of a terminal currently in use is marked as yellow in region 720 of a second screen 700, and a button configured to request the upgrade of the security level of the terminal currently in use is displayed in region 732. When the user selects the button in the region 732, a UI screen configured to perform authentication according to a pre-designated method is displayed, and the terminal currently in use is upgraded to the green PC if the above authentication is successful.

Meanwhile, although not shown in FIG. 7, a list of other terminals used for access to the game through the account of the user may be displayed even when the security level of the terminal currently in use is yellow.

Figure 8:
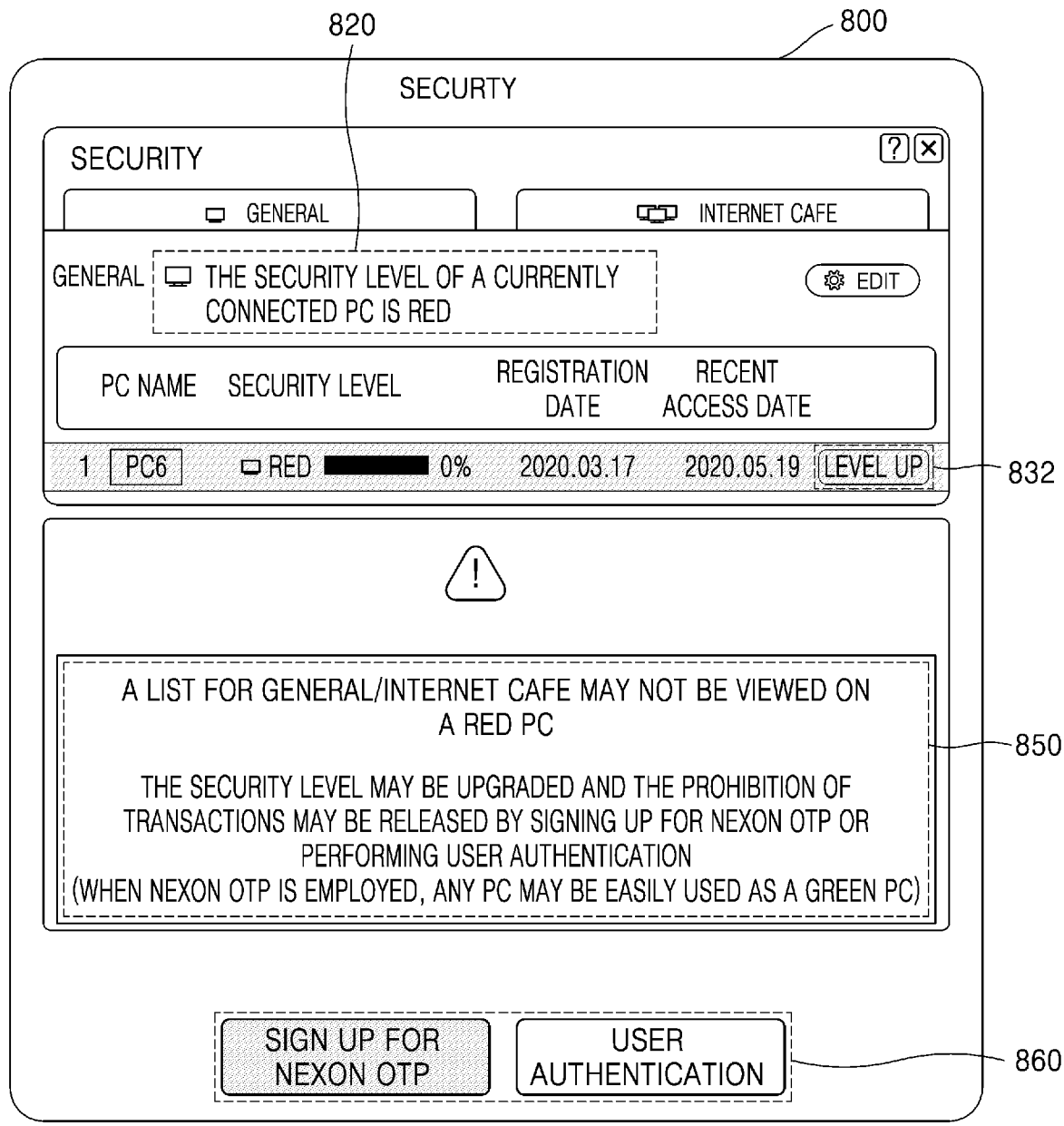

Referring to FIG. 8, the security level of a terminal currently in use is marked as red in region 820 of a third screen 800, and a button configured to request the upgrade of the security level of the terminal currently in use is displayed in region 832. When the user selects the button in the region 832, a UI screen configured to perform authentication according to a pre-designated method is displayed, and the terminal currently in use is upgraded to the green PC if the above authentication is successful.

However, when the security level of a terminal through which the user makes access currently is red, there is possibility that the access is threatening access, and thus a list of other terminals used for access to the game using the account of the user is not displayed. In other words, when the security level of a terminal through which the user makes access currently is red, only the corresponding terminal is displayed in a list. In region 850, not only guidance on the above situation but also guidance on the item required for the upgrade of the security level may be displayed.

The user may upgrade the security level of the terminal currently in use through one-time password (OTP) service or user authentication according to another method by selecting any one of the buttons displayed in region 860.

Figure 9:
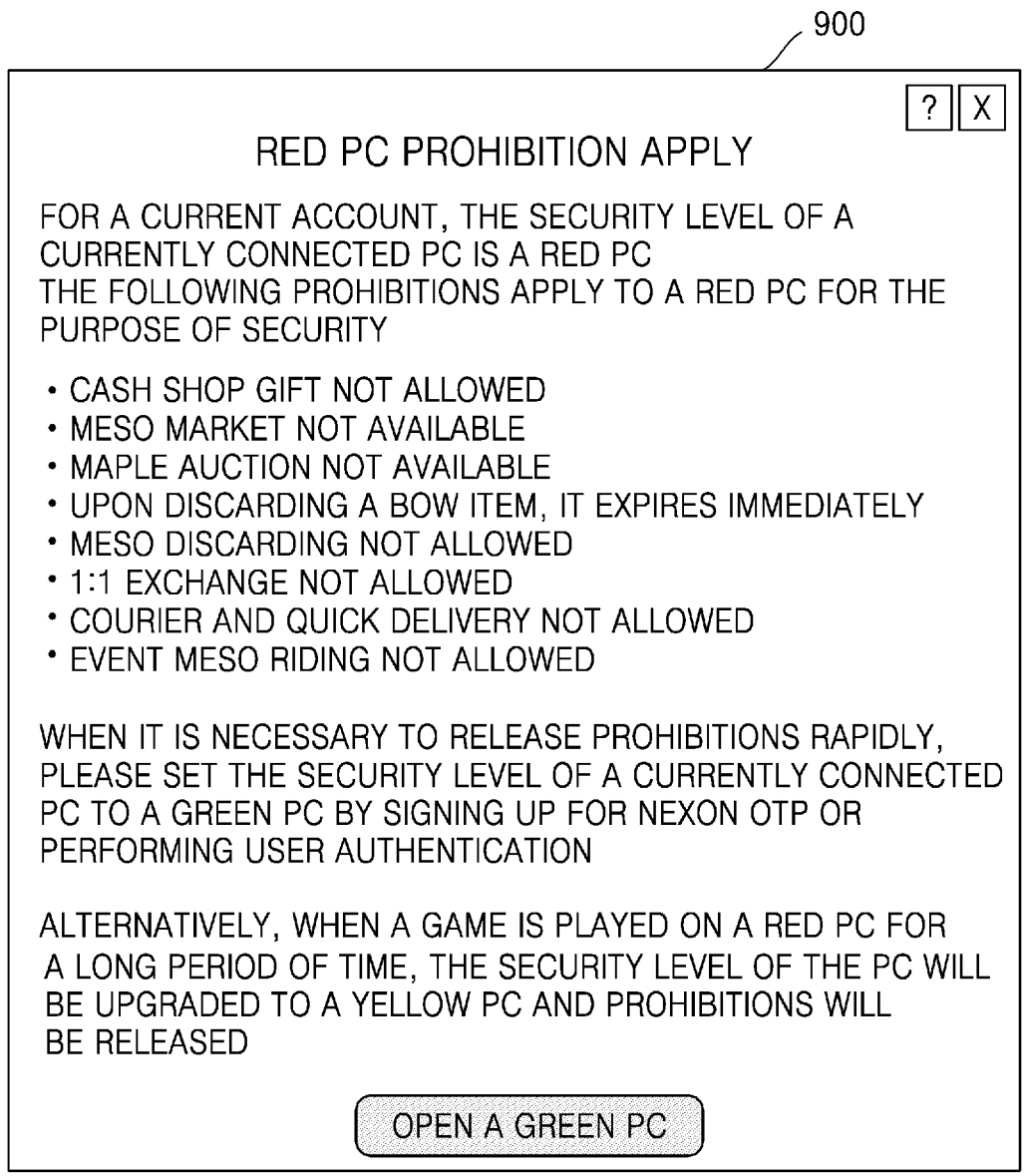

Meanwhile, when the user has accessed the game through a terminal having the security level "red," guidance such as the passage of a third screen 900 shown in FIG. 9 may be displayed on the display of the terminal. Referring to FIG. 9, a list of items that are limited when the game is accessed using a red PC is displayed on the third screen 900, and guidance on the upgrade of the security level is displayed on the display of the terminal.

Figure 10:
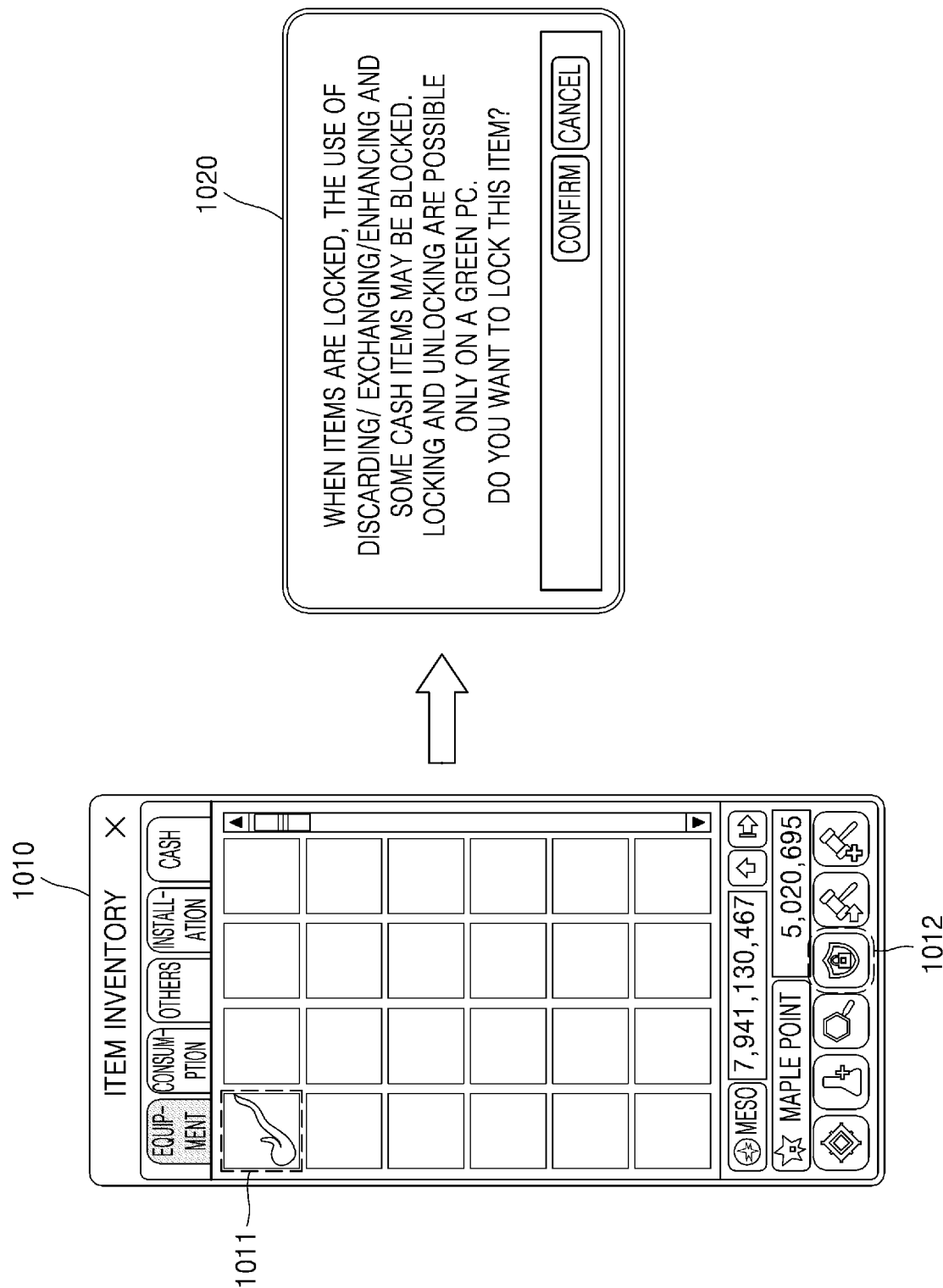

It has been described that when the security level of a terminal is the highest (green), the disposal of in-game goods may be locked and unlocked. FIG. 10 shows a UI screen configured to lock and unlock the disposal of items. Referring to FIG. 10, the user may request the locking of item 1011 by selecting the item 1011 displayed on a fourth screen 1010 and then selecting a locking button 1012 displayed in a lower region. When the user requests the locking, a pop-up such as a fifth screen 1020 is displayed, thereby displaying guidance on the locking and unlocking of the item.

Returning to FIG. 2 again, various types of data such as a file, an application, and a program may be installed and stored in the storage 130. For example, a program configured to provide the game may be installed in the storage 130, and a program installed in the storage 130 may be executed by the controller 120. In addition, various types of information necessary to provide a game based on the security level of the terminal may be stored in the storage 130, and the controller 120 may access information stored in the storage 130 or store new information in the storage 130.

Figure 3:
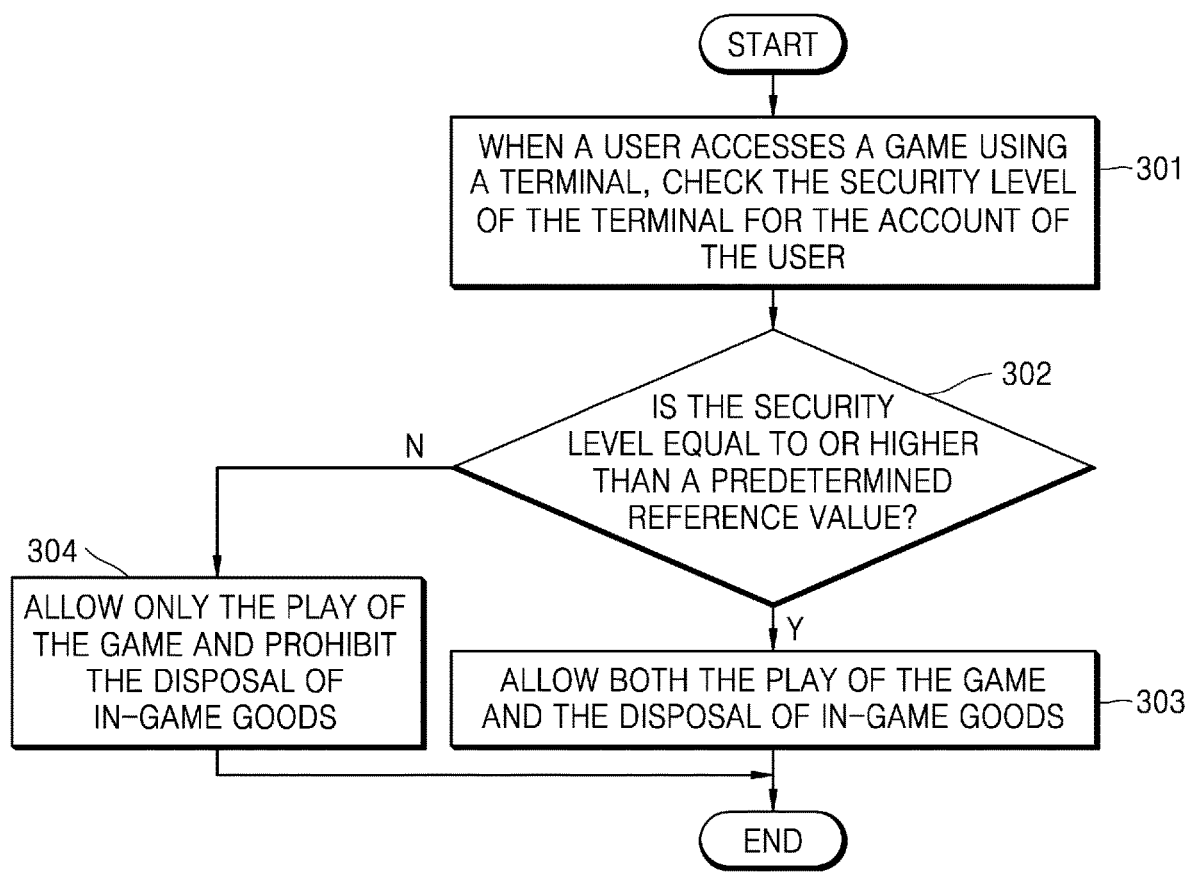
FIGS. 3 to 5 are flowcharts illustrating a method of providing a game based on the security level of a terminal according to an embodiment.
Figure 4:
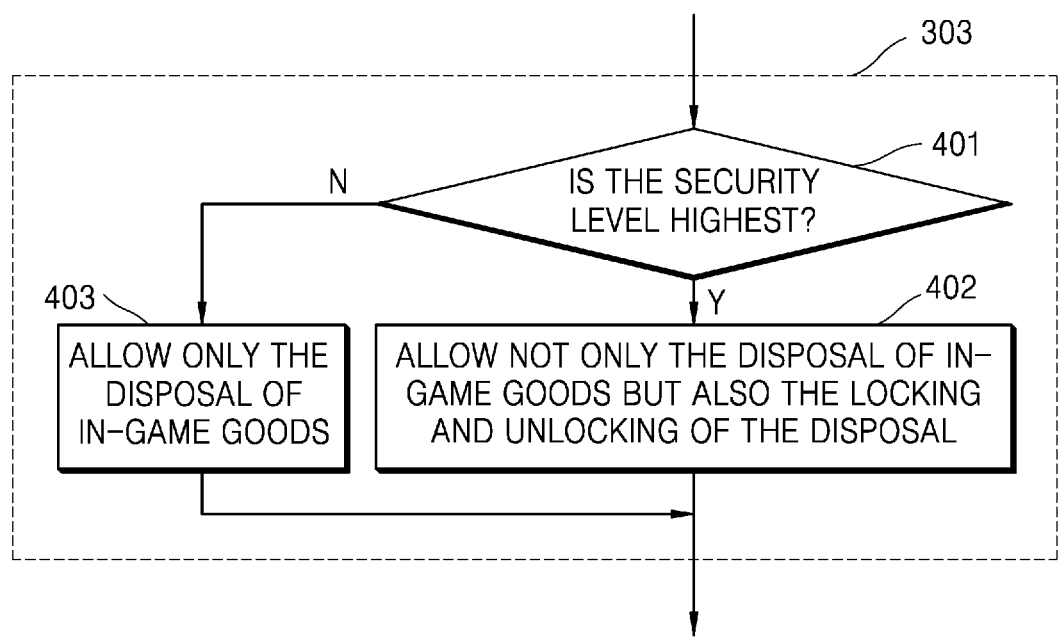
Figure 5:
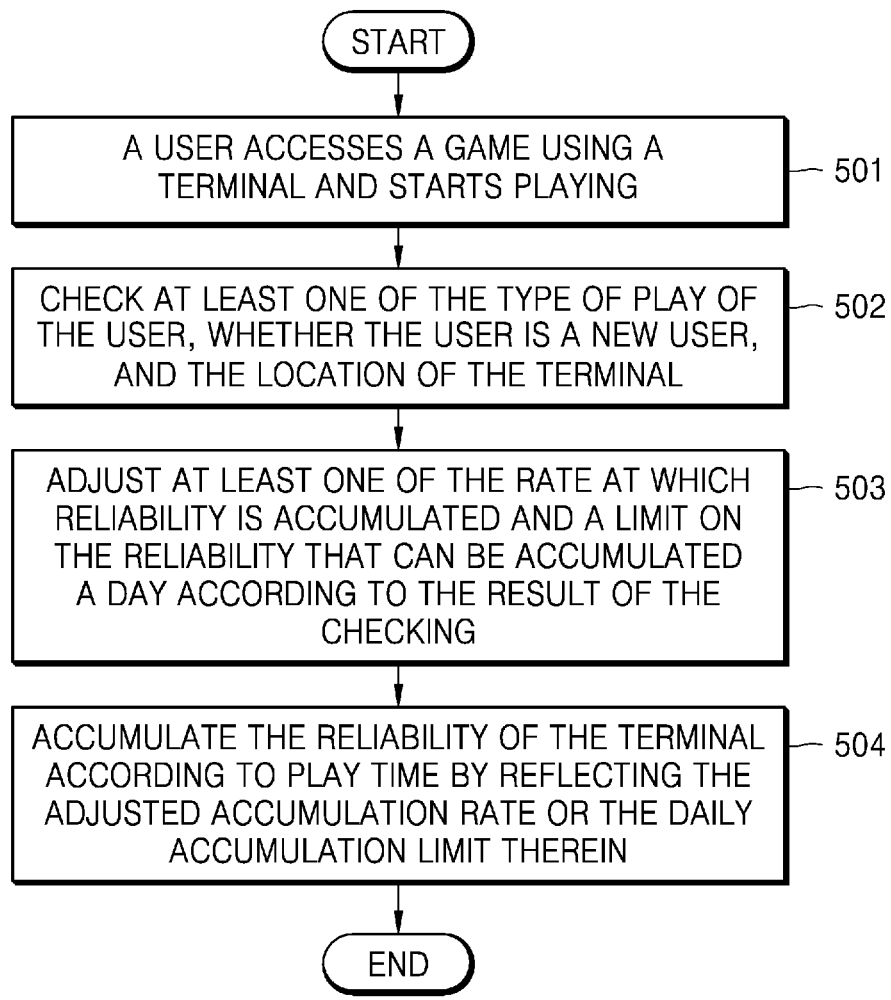

FIGS. 3 to 5 are flowcharts illustrating a method of providing a game based on the security level of a terminal according to an embodiment. The game provision method shown in FIGS. 3 to 5 includes steps that are processed in a time-series manner by the game provision system shown in FIG. 1 and the game server 100 shown in FIG. 2. Accordingly, the descriptions that are omitted below but have been given above in conjunction with the game provision system shown in FIG. 1 and the game server 100 shown in FIG. 2 may also be applied to the game provision method according to the embodiment shown in FIGS. 3 to 5.

Referring to FIG. 3, when a user accesses a game using a terminal, the game server 100 checks the security level of the terminal for the account of the user at step 301.

At step 302, the game server 100 determines whether the found security level of the terminal is higher than or equal to a predetermined reference value. If the found security level is higher than or equal to the predetermined reference value, the game server 100 proceeds to step 303 and allows both the play of a game and the disposal of in-game goods. In contrast, if, as a result of the determination at step 302, the found security level is lower than the predetermined reference value, the game server 100 proceeds to step 304 and allows only the play of a game and prohibits the disposal of in-game goods.

A detailed process included in step 303 is shown in FIG. 4. Referring to FIG. 4, at step 401, the game server 100 determines whether the security level of the terminal checked at step 301 is the highest. If, as a result of the determination, the security level is the highest, the process proceeds to step 402 and allows not only the disposal of in-game goods but also the locking and unlocking of the disposal. In contrast, if, as a result of the determination, the security level is not the highest level, the game server 100 proceeds to step 403 and allows only the disposal of in-game goods.

The game server 100 may adjust the rate at which the reliability is accumulated or a limit on the reliability that can be accumulated for each period by taking into consideration various circumstances. A flowchart of this embodiment is shown in FIG. 5.

When a user accesses a game using a terminal and starts playing the game at step 501, the game server 100 checks at least one of the type of play of the user, whether the user is a new user, and the location of the terminal at step 502.

At step 503, the game server 100 adjusts at least one of the rate at which the reliability is accumulated and a limit on the reliability that can be accumulated a day according to the result of the checking at step 502.

At step 504, the game server 100 accumulates the reliability of the terminal according to the time for which the game is played by reflecting the adjusted accumulation rate or daily accumulation limit therein.

As described above, the game server 100 according to an embodiment determines whether to allow the disposal of in-game goods based on the security level of a terminal used for access to a game. Accordingly, an effect may be expected in that even when an account is hacked, a victim is provided with the time required to recognize and defend against the hacking.

Furthermore, the game server 100 allows a game to be played regardless of the security level of a terminal. Accordingly, an effect may be expected in that even when an account is hacked, it may be possible to minimize inconvenience in playing the game while effectively preventing the theft of in-game goods for a predetermined period of time.

The term "unit" used in the above-described embodiments means software or a hardware component such as a field-programmable gate array (FPGA) or application-specific integrated circuit (ASIC), and a "unit" performs a specific role. However, a "unit" is not limited to software or hardware. A "unit" may be configured to be present in an addressable storage medium, and also may be configured to run one or more processors. Accordingly, as an example, a "unit" includes components, such as software components, object-oriented software components, class components and task components, processes, functions, attributes, procedures, subroutines, segments in program code, drivers, firmware, microcode, circuits, data, a database, data structures, tables, arrays, and variables.

Components and a function provided in "unit(s)" may be coupled to a smaller number of components and "unit(s)" or divided into a larger number of components and "unit(s)."

In addition, components and "unit(s)" may be implemented to run one or more CPUs in a device or secure multimedia card.

The game provision method according to the embodiment described via FIGS. 3 to 5 may be implemented in the form of a computer-readable medium that stores instructions and data that can be executed by a computer. In this case, the instructions and the data may be stored in the form of program code, and may generate a predetermined program module and perform a predetermined operation when executed by a processor. Furthermore, the computer-readable medium may be any type of available medium that can be accessed by a computer, and may include volatile, non-volatile, separable and non-separable media. Furthermore, the computer-readable medium may be a computer storage medium. The computer storage medium may include all volatile, non-volatile, separable and non-separable media that store information, such as computer-readable instructions, a data structure, a program module, or other data, and that are implemented using any method or technology. For example, the computer storage medium may be a magnetic storage medium such as an HDD, an SSD, or the like, an optical storage medium such as a CD, a DVD, a Blu-ray disk or the like, or memory included in a server that can be accessed over a network.

Furthermore, the game provision method according to the embodiment described via FIGS. 3 to 5 may be implemented as a computer program (or a computer program product) including computer-executable instructions. The computer program includes programmable machine instructions that are processed by a processor, and may be implemented as a high-level programming language, an object-oriented programming language, an assembly language, a machine language, or the like. Furthermore, the computer program may be stored in a tangible computer-readable storage medium (for example, memory, a hard disk, a magnetic/optical medium, a solid-state drive (SSD), or the like).

Accordingly, the game provision method according to the embodiment described via FIGS. 3 to 5 may be implemented in such a manner that the above-described computer program is executed by a computing apparatus. The computing apparatus may include at least some of a processor, memory, a storage device, a high-speed interface connected to memory and a high-speed expansion port, and a low-speed interface connected to a low-speed bus and a storage device. These individual components are connected using various buses, and may be mounted on a common motherboard or using another appropriate method.

In this case, the processor may process instructions within a computing apparatus. An example of the instructions is instructions which are stored in memory or a storage device in order to display graphic information for providing a Graphic User Interface (GUI) onto an external input/output device, such as a display connected to a high-speed interface. As another embodiment, a plurality of processors and/or a plurality of buses may be appropriately used along with a plurality of pieces of memory. Furthermore, the processor may be implemented as a chipset composed of chips including a plurality of independent analog and/or digital processors.

Furthermore, the memory stores information within the computing device. As an example, the memory may include a volatile memory unit or a set of the volatile memory units. As another example, the memory may include a non-volatile memory unit or a set of the non-volatile memory units. Furthermore, the memory may be another type of computer-readable medium, such as a magnetic or optical disk.

In addition, the storage device may provide a large storage space to the computing device. The storage device may be a computer-readable medium, or may be a configuration including such a computer-readable medium. For example, the storage device may also include devices within a storage area network (SAN) or other elements, and may be a floppy disk device, a hard disk device, an optical disk device, a tape device, flash memory, or a similar semiconductor memory device or array.

According to any one of the above-described technical solutions, whether to allow the disposal of in-game goods is determined based on the security level of a terminal used for access to a game, so that an effect may be expected in that even when an account is hacked, a victim is provided with the time required to recognize and defend against the hacking.

According to any one of the above-described technical solutions, a game is allowed to be played regardless of the security level of a terminal, so that an effect may be expected in that even when an account is hacked, it may be possible to minimize inconvenience in playing the game while effectively preventing the theft of in-game goods for a predetermined period of time.

The effects that can be obtained by the embodiments disclosed herein are not limited to the above-described effects, and other effects that have not been described above will be clearly understood by those having ordinary skill in the art, to which the present invention pertains, from the foregoing description.

The above-described embodiments are intended for illustrative purposes. It will be understood that those having ordinary knowledge in the art to which the present invention pertains can easily make modifications and variations without changing the technical spirit and essential features of the present invention. Therefore, the above-described embodiments are illustrative and are not limitative in all aspects. For example, each component described as being in a single form may be practiced in a distributed form. In the same manner, components described as being in a distributed form may be practiced in an integrated form.

The scope of protection pursued through the present specification should be defined by the attached claims, rather than the detailed description. All modifications and variations which can be derived from the meanings, scopes and equivalents of the claims should be construed as falling within the scope of the present invention.

What is claimed is:

1. A method of providing a game based on a security level of a terminal, the method comprising:
when a user accesses the game using the terminal with an account of the user, checking the security level of the terminal for the account of the user; and
determining whether to allow disposal of in-game goods according to the found security level, but providing the game so that the game can be played regardless of the found security level,
wherein the security level of the terminal is determined according to reliability of the terminal for the account of the user, which is accumulated in proportion to a time for which the user plays the game through the terminal with the account of the user.

2. The method of claim 1, wherein providing the game comprises allowing the disposal of in-game goods only when the found security level is equal to or higher than a first reference value.

3. The method of claim 2, wherein providing the game comprises allowing locking and unlocking of the disposal of in-game goods when the found security level is equal to or higher than a second reference value,
wherein the second reference value is higher than the first reference value.

4. The method of claim 1, wherein a rate at which the reliability is accumulated or a limit on the reliability that can be accumulated for each predetermined period varies depending on at least one of a type of play of the user, whether the user is a new user, and a location of the terminal.

5. The method of claim 1, wherein the security level of the terminal is determined to be highest when the user performs authentication according to a pre-designated method upon access to the game.

6. The method of claim 1, further comprising displaying a user interface (UI) screen configured to check and manage the security level on the terminal.

7. The method of claim 6, wherein:
displaying the UI screen on the terminal comprises displaying a list of other terminals having a history of playing the game using the account of the user when the security level of the terminal is equal to or higher than a predetermined reference value; and
the UI screen provides a function of managing security levels and reliabilities of the other terminals.

8. The method of claim 1, wherein:
checking the security level of the terminal comprises checking the security level based on unique identification information of the terminal; and
the unique identification information is generated using hardware and location information of the terminal.

9. A non-transitory computer-readable storage medium having stored thereon a computer program that, when executed by a processor, causes the processor to perform the method of claim 1.

10. A computer program that is executed by a game provision apparatus and stored in a non-transitory computer-readable storage medium to perform the method of claim 1.

11. An apparatus for providing a game, the apparatus comprising:
- a communication interface configured to perform communication with a terminal;
- storage configured to store data and a program necessary for provision of the game; and
- a controller configured to provide the game based on a security level of the terminal by executing the program;
- wherein the controller, when a user accesses the game using the terminal with an account of the user, checks the security level of the terminal for the account of the user, and determines whether to allow disposal of in-game goods according to the found security level, but provides the game so that the game can be played regardless of the found security level, and
- wherein the controller determines the security level of the terminal according to reliability of the terminal for the account of the user, and the controller accumulates the reliability of the terminal for the account of the user in proportion to a time for which the user plays the game through the terminal with the account of the user.

12. The apparatus of claim 11, wherein the controller allows the disposal of in-game goods only when the found security level is equal to or higher than a first reference value.

13. The apparatus of claim 12, wherein the controller allows locking and unlocking of the disposal of in-game goods when the found security level is equal to or higher than a second reference value,
- wherein the second reference value is higher than the first reference value.

14. The apparatus of claim 11, wherein the controller sets a rate at which the reliability is accumulated or a limit on the reliability that can be accumulated for each predetermined period differently depending on at least one of a type of play of the user, whether the user is a new user, and a location of the terminal.

15. The apparatus of claim 11, wherein the controller determines the security level of the terminal to be highest when the user performs authentication according to a pre-designated method upon access to the game.

16. The apparatus of claim 11, wherein the controller displays a user interface (UI) screen configured to check and manage the security level on the terminal.

17. The apparatus of claim 16, wherein the controller:
- in displaying the UI screen on the terminal, displays a list of other terminals having a history of playing the game using the account of the user when the security level of the terminal is equal to or higher than a predetermined reference value; and
- provides a function of managing security levels and reliabilities of the other terminals through the UI screen.

18. The apparatus of claim 11, wherein:
- the controller checks the security level based on unique identification information of the terminal; and
- the unique identification information is generated using hardware and location information of the terminal.

* * * * *